(12) United States Patent
Besler et al.

(10) Patent No.: US 6,461,056 B1
(45) Date of Patent: Oct. 8, 2002

(54) CONNECTOR WITH SECONDARY LOCKING MECHANISM

(75) Inventors: Martin Besler, Nuremberg; Harald Lutsch, Rosstal, both of (DE)

(73) Assignee: Framatome Connectors Incorporated, Courbevoie (FR)

( * ) Notice: Subject to any disclaimer, the term of this patent is extended or adjusted under 35 U.S.C. 154(b) by 0 days.

(21) Appl. No.: 09/646,087
(22) PCT Filed: Mar. 2, 1999
(86) PCT No.: PCT/EP99/01342
§ 371 (c)(1),
(2), (4) Date: Sep. 13, 2000
(87) PCT Pub. No.: WO99/47957
PCT Pub. Date: Sep. 23, 1999

(30) Foreign Application Priority Data

Mar. 13, 1998 (DE) .......................... 198 11 020
Mar. 16, 1998 (DE) .......................... 198 11 291

(51) Int. Cl.⁷ .................................................. G02B 6/36
(52) U.S. Cl. ........................................ 385/76; 439/352
(58) Field of Search ............................ 439/357, 352, 439/358; 385/76, 75, 78

(56) References Cited

U.S. PATENT DOCUMENTS

| | | | |
|---|---|---|---|
| 5,134,676 A | 7/1992 | Boillot et al. | 385/72 |
| 5,579,425 A | 11/1996 | Lampert et al. | 385/59 |
| 5,692,080 A | * 11/1997 | Lu | 385/55 |
| 5,718,596 A | 2/1998 | Inaba et al. | 439/352 |
| 5,830,000 A | * 11/1998 | Shifflett et al. | 439/352 |
| 5,938,470 A | * 8/1999 | Kashiyama | 439/357 |

FOREIGN PATENT DOCUMENTS

| | | |
|---|---|---|
| DE | 3109996 C2 | 9/1982 |
| DE | 3701421 A1 | 7/1988 |
| DE | 4410444 A1 | 9/1995 |
| DE | 19525257 A1 | 1/1997 |
| DE | 19535836 A1 | 3/1997 |
| DE | 19642578 A1 | 4/1997 |
| EP | 0571325 A1 | 11/1993 |
| EP | 0762558 A2 | 3/1997 |

* cited by examiner

Primary Examiner—Brian Sircus
Assistant Examiner—Brian S. Webb
(74) Attorney, Agent, or Firm—Perman & Green, LLP

(57) ABSTRACT

A connector is specified having a housing (1) with at least one holding shaft (2) for a complementary plug (3), the connector respectively having a spring arm (4) which bounds the holding shaft (2) on one side, presses on the corresponding side of the complementary plug (3) and locks the plug (3) there in its inserted position, and by a bow (5) as secondary locking mechanism, which holds the free end (6) of the spring arm (4) detachably in the position latched with the plug.

17 Claims, 6 Drawing Sheets

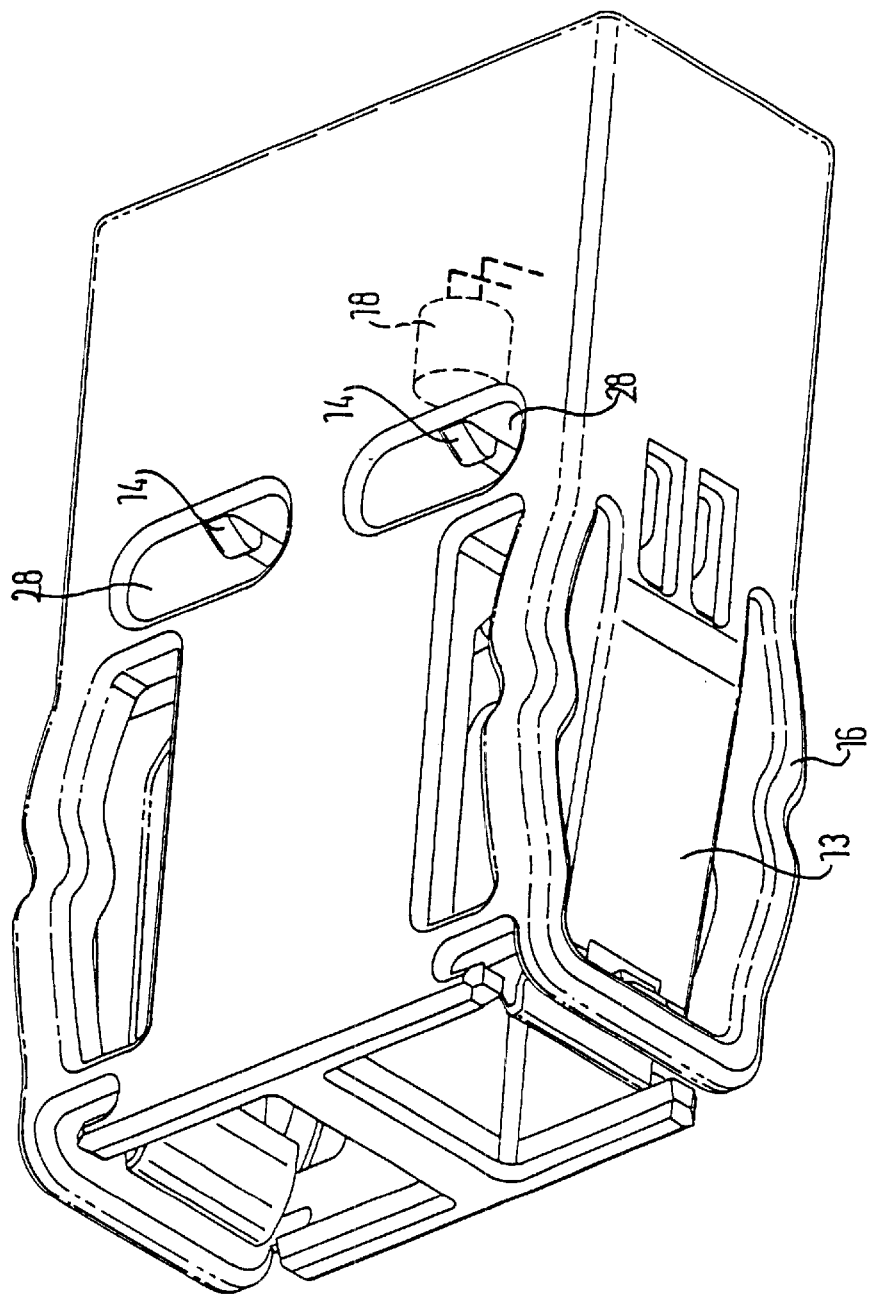

CONNECTOR WITH SECONDARY LOCKING MECHANISM

BACKGROUND OF THE INVENTION

1. Field of the Invention

The present invention relates to a connector having a housing with at least one holding shaft, the housing adapted to received a complementary plug and to the connector being in the form of an optical waveguide compling.

2. Description of Prior Developments

For some applications of such connectors, it is of decisive importance that the demountable connection cannot be undone in an uncontrolled fashion, and that it is completely certain that the plug parts are also plugged into one another correctly and completely.

For this purpose, in addition to a first locking mechanism, use is made of secondary locking mechanisms whose actuation is possible only if the plug parts are correctly interconnected, on the one hand, and which, furthermore, prevent the demountable connection from being inadvertently undone. Such demountable connections with secondary locking mechanisms are often complicated and generally comprise a plurality of parts.

The present invention relates further to an optical waveguide coupling. It is important in the case of such optical waveguide couplings for the losses in light intensity at the transition from one optical waveguide cable to the other or from an optical waveguide cable to an electro-optical element, having an optical input or output, to be kept as low as possible. For this purpose, it is necessary to keep the surface of the end face of the optical waveguide absolutely free from dust or other contaminants and to ensure this freedom from dust permanently. Moreover, such a coupling must be robust and compact.

Known optical waveguide couplings do not presently fulfil these requirements optimally. Thus, U.S. Pat. No. 5,134,676 discloses a fibre optic coupler in which the coaxially opposite fibre ends of optical fibres to be connected crimp between them a diaphragm which is transparent and has the same refractive index as the optical fibres themselves. The result is to produce a good optical transition between the fibres to be connected. However, owing to the mechanical contact between the end faces of the optical fibres and the diaphragm there is the risk of dust particles located thereon scratching the end faces of the optical fibres, in particular if the coupling is quite frequently undone and reconnected.

SUMMARY OF THE INVENTION

It is an object of the present invention to improve a connector of the type mentioned at the beginning in such a way that it has a secondary locking mechanism which can be designed in one piece with the connector housing, is compact and is easy to operate.

It is therefore another object of the present invention to present an optical waveguide coupling which is tight against dust, liquid and gaseous media, is compact, is very secure against being pulled out inadvertently, and is easy to operate.

BRIEF DESCRIPTION OF THE DRAWINGS

These objects are achieved in accordance with the claims 1 and 6, respectively. Preferred embodiments of the invention are explained in more detail in the subclaims with reference to the drawing, in which:

FIG. 6 shows an optical waveguide coupling with integrated electro-optical elements.

DESCRIPTION OF THE PREFERRED EMBODIMENTS

Figure 1:
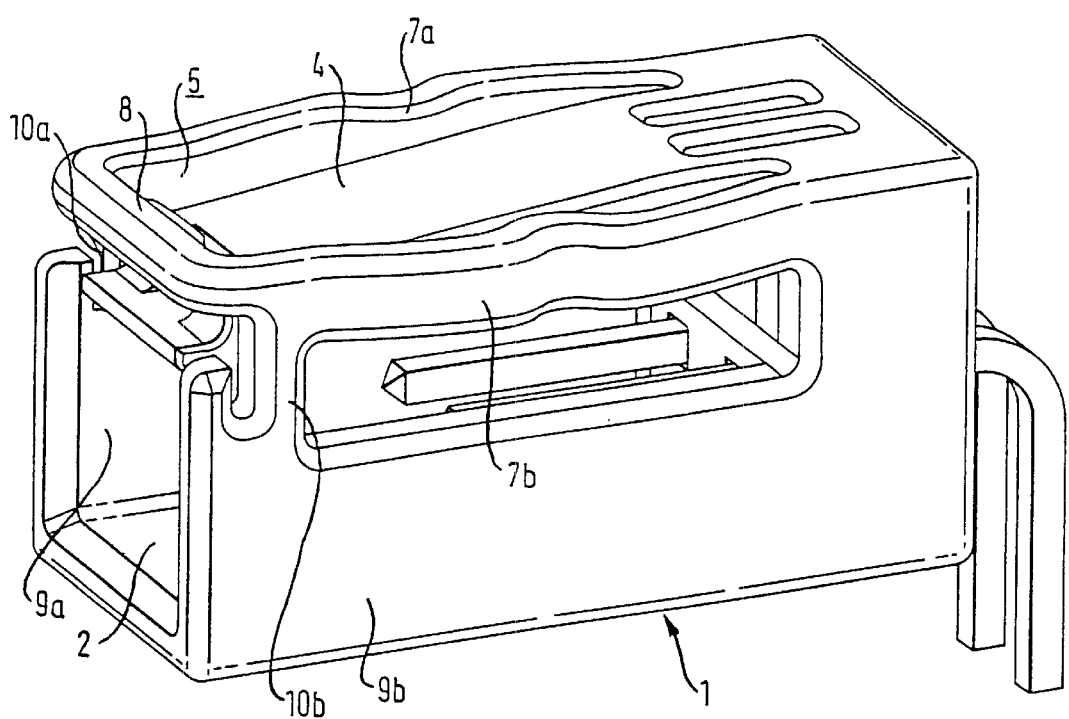
FIG. 1 shows a perspective view of a connector according to the invention.

The connector shown in FIG. 1 has a housing 1, which is essentially cuboidal and has, on the left-hand side, the opening of a holding shaft 2 for a complementary plug 3. The upper housing surface has a spring arm 4 whose free end 6 is located in the vicinity of the inlet of the holding shaft 2 and which is surrounded by a bow 5 which, on the one hand, is separated from the rest of the housing by cutouts in the side walls and in the inlet region of the holding shaft and, on the other hand, is fastened to the housing by thin struts 10a, 10b in the end region of the bow with the result that compressing the limbs 7a, 7b of the bow 5 has the effect of moving the end face 8 of the bow forwards, that is to say against the plug-in direction of the complementary plug. In its rest position, that is to say when the two bent limbs 7a, 7b are not compressed, the end region of the bow 5 is situated such that the free end of the spring arm 4 presses elastically against said bow. This ensures that the spring arm 4 is secured in the position shown in FIG. 2C and cannot release the complementary plug 3. Moreover, it is evident from FIG. 2C that there is constructed on the head end of the spring arm a latching hook 13 which grips a latching nose 12 behind on the top side of the complementary plug 3. When the complementary plug 3 is inserted into the housing 1, it firstly pushes away the spring arm 4 via its latching hook 13 over the latching nose 12, the spring arm 4 latching with the end face 8 of the bow 5. By compressing the limbs 7a, 7b this fixture is undone again and the spring arm 4 is pressed under stress against the top side of the complementary plug 3 behind the latching nose 12. The end region 8 of the bow 5 prevents the spring arm 4 from being able to be detached from this position. This ensures locking in two respects. On the one hand, inadvertent undoing, for example by holding on the cable of the complementary plug 3, is impossible and, on the other hand, latching cannot be performed until the plug 3 is completely inserted into the housing 1.

Figure 2A:
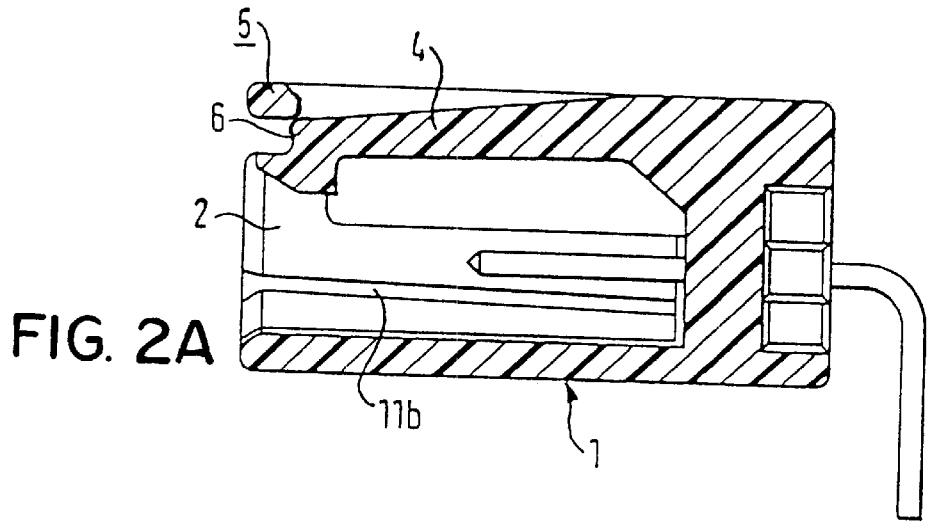
FIGS. 2A to 2C show longitudinal and cross-sections through the connector shown in FIG. 1.
Figure 2B:
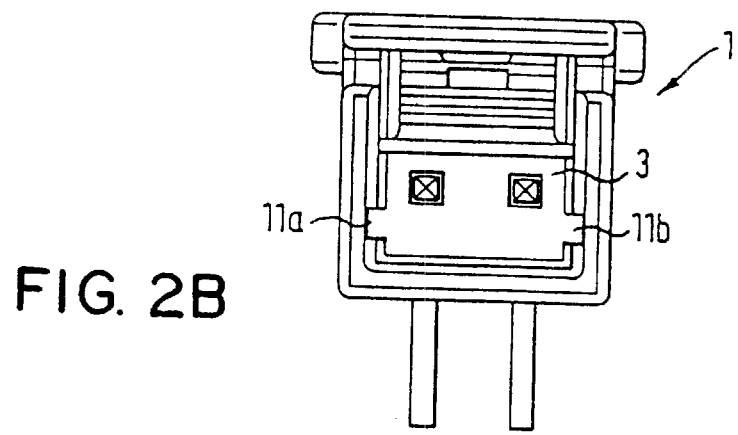
Figure 2C:
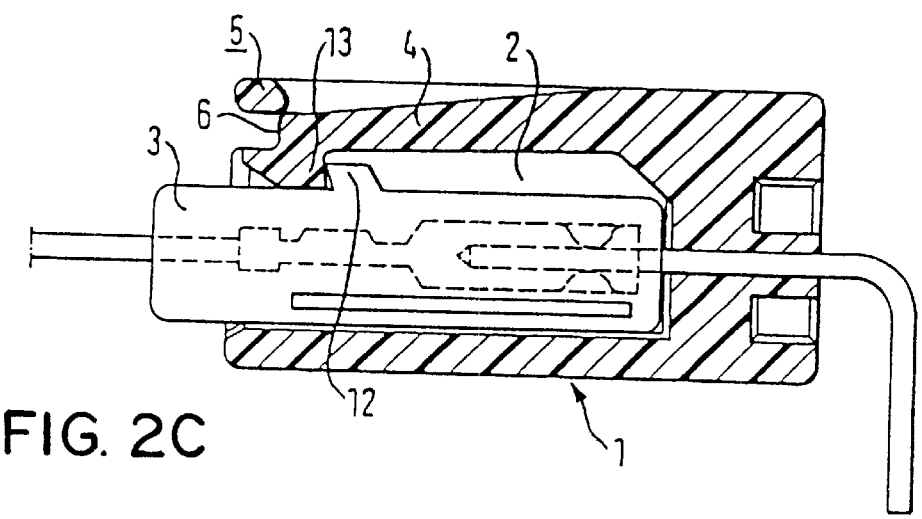

Clearly in evidence in FIGS. 2A and 2B are the guide grooves 11a, 11b in the side walls of the housing 1, in which the complementary plug 3 is guided by means of correspondingly designed ribs in its side walls.

Figure 3:
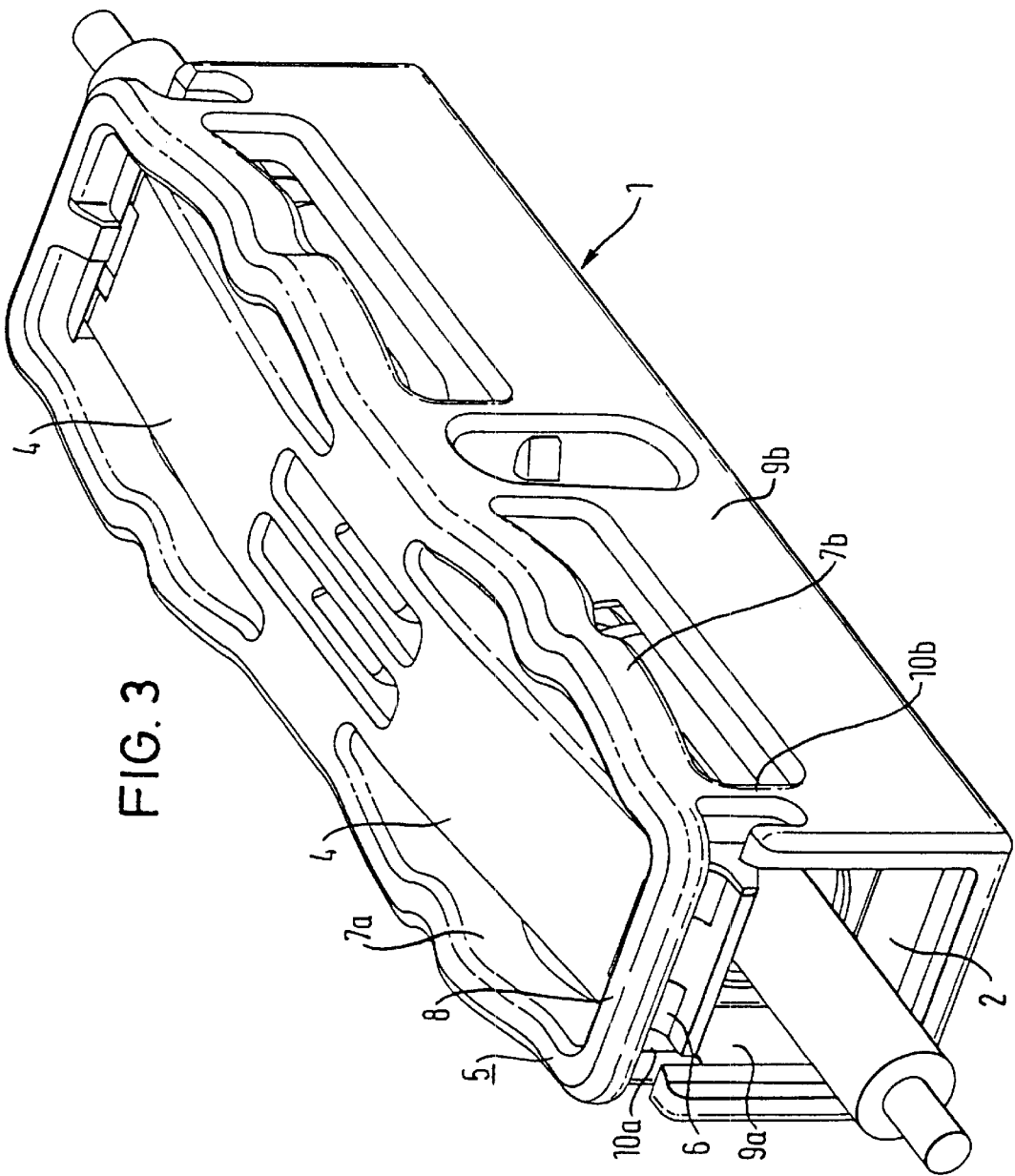
FIG. 3 shows a second embodiment of the connector according to the invention.

FIG. 3 shows a further embodiment of the connector according to the invention, in which two holding shafts are arranged coaxially in the housing, it being possible for two complementary plugs to be arranged in opposite senses on an axis. This type of multiple connection is used, in particular, in connecting optical waveguide cables, the plugs having end regions with carefully prepared fibre ends which are placed accurately opposite one another at a small spacing from one another, in order to transport light signals from one optical waveguide cable to the other. As is easy to see in FIG. 3, the arrangement is mirror symmetrical, with the result that the secondary locking members are merely doubled by comparison with the embodiment shown in FIG. 1.

The connector described here can be produced in one piece as an injection-moulded part and is very compact. It is very simple to operate, and therefore raises no difficulty even under cramped conditions of space at the installation site. The demountable connection can be in two parts but it is also possible for a plurality of connections to be combined in one housing.

Figure 4:
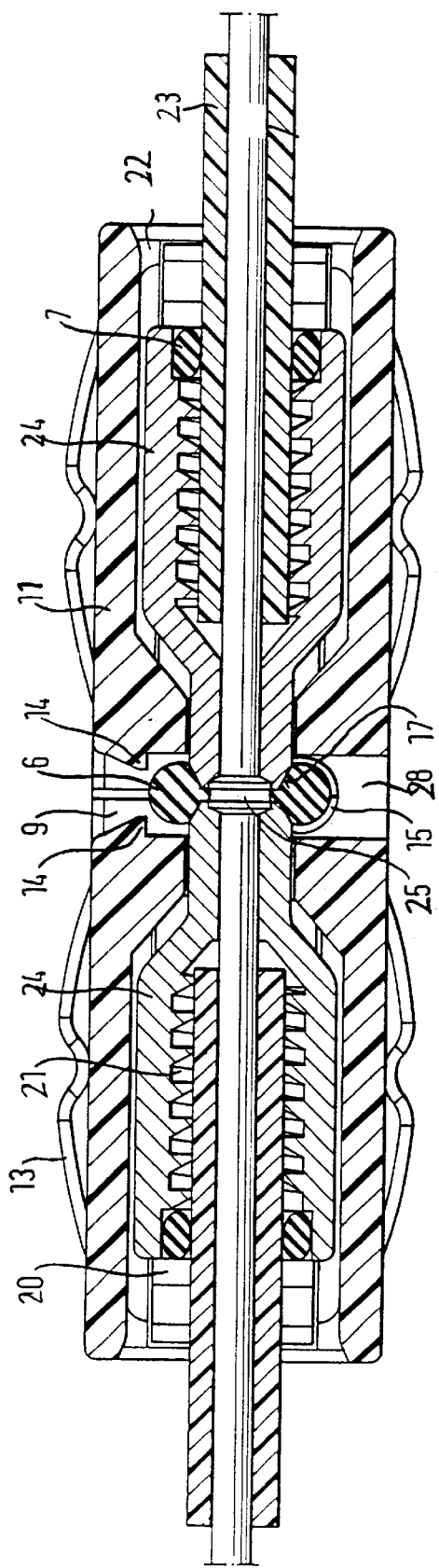
FIG. 4 shows a longitudinal section through the optical waveguide coupling according to the invention.

The housing, which is sectioned in FIG. 4 in a section coaxial with the axis of the optical waveguide 22, preferable consists of plastic and is single-storied. The optical waveguide cables 23 to be connected are "stripped" at their ends and are located in optical waveguide connectors of the type described in Patent DE 44 10 444 of the applicants. These are connectors whose cable-side sleeve is crimped with the sheath of the optical waveguide cable 23, the front end of the connector closely enclosing the optical waveguide. The end face of the optical waveguide connector is treated by a hot-plate method, with the result that it has an absolutely flat and optically acceptable surface.

Two such connectors 24 are arranged coaxially and opposite one another in the housing 21 and latched in chambers 22 provided for the purpose. The latching is performed firstly via hooks which are provided at the cable-side end of the connectors 24 and grip the connector behind in the plugged-in position, this hook 20 secondly being additionally secured in its latched position by secondary locking mechanisms 23.

On the cable side, the interspace between the connector 24 and the cable 23 is sealed by an O-ring 27. Mounted in the chamber 28 of the housing 21 is an O-ring 26, which is lightly crimped by the head ends of the two optical waveguide connectors 24 and tightly seals a space between the head faces. As a result, the interspace 25 between the end faces of the optical waveguide cables is sealed against dust, liquid and gaseous media, and this reduces optical losses at these interfaces.

An optically even more effective transition is produced by eliminating the necessarily occurring refractive index discontinuity at the respective ends of the optical waveguide cables. This is achieved by filling the cavity between the optical waveguide ends and the O-ring 26 with a liquid which has the same refractive index as the optical waveguide fibres themselves.

The O-ring is secured in the cutout 28 against inadvertently falling out, this being done by the rear wall 15, on the one hand, and by retaining noses 14 at the other end of the cutout 28 on the other hand. The O-ring can be removed by using a pin to press it out of the cutout 28 against the crimping force of the retaining noses 14.

The O-ring 26 is centred on the ends of the optical waveguide connectors 24 by virtue of the fact that the head ends of the connector sleeves, which surround the head faces of the optical waveguide fibres, are bevelled outwards. This ensures that the O-ring 26 runs concentrically with the longitudinal axis of the optical waveguide cables 23 and does not disturb the optical transition from one cable end to the other. At the same time, the cable ends or the connector end faces are centred relative to one another, with the result that transition losses are minimized. The reference 20 denotes a latching hook which grips behind the rear edge of the connector 24 in order to lock the latter.

Figure 5:
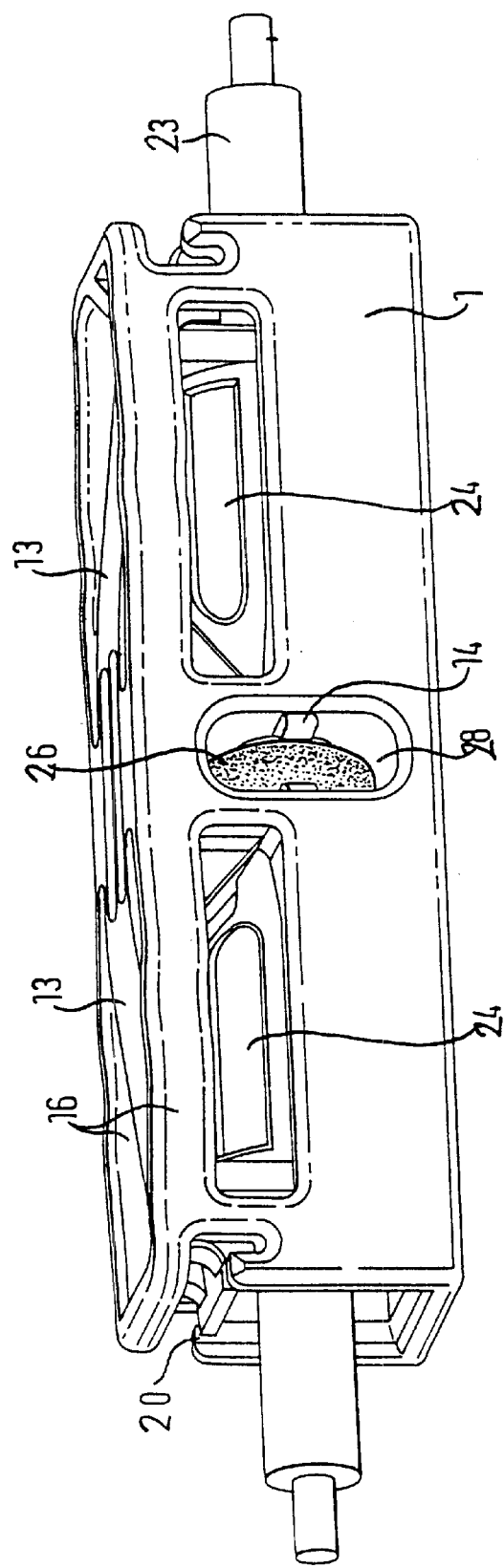
FIG. 5 shows a perspective side view of the optical waveguide coupling according to FIG. 1.

As is best to be seen in FIG. 5 and FIG. 6, laterally compressible limbs 16 are further provided, and in the compressed state they release a tongue 13 which grips elastically behind the latch 20 and locks the latter in a secondary fashion.

FIG. 5 further shows the opening 28 with the O-ring 26, which is secured against inadvertently falling out by the retaining noses 14. On the opposite side, the opening 28 has smaller dimensions than the O-ring 26 with the result that it is possible from there to press the O-ring out of the opening shown only by means of a pin. The windows left free underneath the arms 16 merely serve the purpose of making the arms 16 freely movable, and can simultaneously be used to monitor the proper insertion of the connectors 24 as far as their latching position.

FIG. 6 shows an embodiment of the present invention in which a double connector, that is to say two insertion shafts, arranged parallel to one another, for optical waveguide connectors, are provided, opposite which there are two electro-optical elements 18, with the result that the end faces of the optical waveguide fibres are placed opposite the optical inputs and outputs of the electro-optical elements 18 and the interspace between these surfaces is enclosed by an O-ring in a fashion entirely analogous to the exemplary embodiment shown in FIGS. 4 and 5. The O-rings are again inserted through shafts 28. The secondary locking of the optical waveguide connectors is performed, in turn, via the tongue 13 which grips behind the latch 10 through being released after actuation of the arms 16.

What is claimed is:

1. A connector comprising a housing with at least one holding shaft for a complementary plug, wherein in each case a spring arm which bounds the holding shaft on one side, presses on the corresponding side of the complementary plug and locks the plug there in its inserted position, and by a bow as secondary locking mechanism, which holds the free end of the spring arm detachably in the position latched with the plug, the bow enclosing the spring arm in a U-shaped fashion with limbs lightly cambered outwardly and, in a rest position is adapted to press with its base region against the top side of the spring arm.

2. A connector according to claim 1, wherein an end face of said spring arm can be latched with a base region of said bow in a position in which the spring arm does not lock said complementary plug, thereby adapting said connector to undo said latch by compressing said limbs.

3. A connector according to claim 1, wherein said spring arm is separated from said housing by cutouts in two mutually parallel side walls of said holding shaft and, in the region of an inlet opening of said holding shaft, is moveably joined by thin webs to side walls at front edges thereof.

4. A connector according to claim 1, wherein two complementary plugs are provided coaxially with opposite alignment in said housing.

5. A connector according to claim 4, wherein said plugs are optical waveguide plugs which together form an optical waveguide coupling.

6. A connector according to claim 1, wherein said complementary plug is guided in guide grooves in shaft walls and has on its side opposite said spring arm a latching nose which co-operates with a latching hook constructed on said free end of said spring arm.

7. A connector according to claim 1, wherein said spring arm and said base region of said bow are latched with one another in a position in which said spring arm does not lock said complementary plug.

8. A connector according to claim 5, further comprising a lateral cut-out for the introduction of an O-ring to align said plugs.

9. A connector according to claim 5, having a housing for coaxially holding optical waveguide cables to be connected or electro-optical elements having optical waveguide connectors, which are latched in the housing in a position in which end faces of the optical waveguide cables are situated opposite one another at a slight spacing, wherein a latched state of the optical waveguide connectors include an O-ring with a smaller inside diameter than the outside diameter of the end face of the optical waveguide connectors enclosing an interspace between the end faces of the optical waveguide connectors in a sealing fashion exerting crimping stress.

10. A connector in the form of an optical waveguide coupling according to claim 9, wherein said interspace is filled with a fluid which essentially has the same refractive index as optical waveguide fibres.

11. A connector in the form of an optical waveguide coupling according to claim 9, wherein at a region of the O-ring transverse to an axis of said optical waveguide cable axis, said housing has a cutout through which said O-ring can be fitted or removed.

12. An optical waveguide coupling according to claim 11, wherein said cutout is open continuously on one side for an O-ring, and is provided with retaining noses on the side walls of the opening, and has on the opposite side of said housing a smaller opening than the outside radius of said O-ring, for the purpose of inserting a pin by means of said O-ring is thereby removed.

13. An optical waveguide coupling according to claim 9, wherein edges of said end faces of said optical waveguide connectors are bevelled such that they center said O-ring and said O-ring in turn centers them.

14. An optical waveguide coupling according to claim 5, wherein said housing consists of plastic and said O-ring consists of rubber or an elastomer.

15. An optical waveguide coupling according to claim 5, wherein said optical waveguide connectors are held in said housing at their cable-side end by a primary locking mechanism, and a secondary locking mechanism is provided, which latches the primary locking mechanism.

16. An optical waveguide coupling according to claim 5, wherein further including in said housing is an electro-optical transmitting and/or receiving element having an optical input or output and whose end face is identical to that of an optical waveguide connector.

17. An optical waveguide coupling according to claim 5, wherein in said housing two connectors or 2×2 connectors are arranged parallel to one another and are interconnected, or n connections are performed in the shape of a star.

* * * * *